(12) United States Patent
Bardin et al.

(10) Patent No.: US 12,304,537 B2
(45) Date of Patent: May 20, 2025

(54) RAILWAY CARRIAGE WITH VEHICLE MONITORING SYSTEM AND ASSOCIATED MONITORING METHOD

(71) Applicants: ALSTOM HOLDINGS, St Ouen sur Seine (FR); SNCF Voyageurs, Saint-Denis (FR)

(72) Inventors: François Bardin, Lesquin (FR); Frédéric Houze, Aubry-du-Hainaut (FR); Thibaut Leroy, Roubaix (FR)

(73) Assignees: ALSTOM HOLDINGS, Saint-Ouen-sur-Seine (FR); SNCF Voyageurs, Saint-Denis (FR)

( * ) Notice: Subject to any disclaimer, the term of this patent is extended or adjusted under 35 U.S.C. 154(b) by 231 days.

(21) Appl. No.: 17/661,228

(22) Filed: Apr. 28, 2022

(65) Prior Publication Data

US 2022/0348240 A1 Nov. 3, 2022

(30) Foreign Application Priority Data

May 3, 2021 (FR) ...................................... 21 04642

(51) Int. Cl.
*B61L 15/00* (2006.01)
*B61C 3/00* (2006.01)

(52) U.S. Cl.
CPC ............ *B61L 15/0081* (2013.01); *B61C 3/00* (2013.01)

(58) Field of Classification Search
CPC .... B61L 15/0081; B61C 3/00; B60L 2200/26; B60L 2240/545; B60L 2240/547;
(Continued)

(56) References Cited

U.S. PATENT DOCUMENTS 5,931,245 A 8/1999 Uetake et al.
2009/0130538 A1 5/2009 Kaita et al.
(Continued)

FOREIGN PATENT DOCUMENTS

DE 102010045514 B4 3/2018
EP 3208882 A1 8/2017
(Continued)

OTHER PUBLICATIONS

Machine Translation of JP-2004048854-A (Year: 2004).*
French Search Report issued for French Patent Application No. FR 2104642, dated Nov. 23, 2021 in 2 pages.

*Primary Examiner* — Anne Marie Antonucci
*Assistant Examiner* — Jordan T Smith
(74) *Attorney, Agent, or Firm* — Knobbe, Martens, Olson & Bear, LLP (57) ABSTRACT

A railway carriage has a number of batteries, a charger associated with each of the batteries and at least one piece of equipment powered by the batteries, and a vehicle monitoring system. The monitoring system includes at least one sensor of a battery state parameter for each battery, a communication network adapted to receive information from each sensor of a battery state parameter and from each charger, and to transmit the received information to a processor. The processor is adapted to process information relating to a battery whose associated charger is switched off or defective using the information received for the other batteries.

10 Claims, 7 Drawing Sheets

(58) Field of Classification Search
CPC .. B60L 2240/549; B60L 2250/16; B60L 1/00; B60L 1/003; B60L 1/02; B60L 1/14; B60L 3/003; B60L 3/0046; B60L 3/0092; B60L 3/12; B60L 58/10; B60L 58/12; B60L 58/16; B60L 58/18; B60L 1/006
See application file for complete search history.

(56) References Cited

U.S. PATENT DOCUMENTS

| | | | | |
|---|---|---|---|---|
| 2011/0248719 | A1* | 10/2011 | Aoki | H01M 10/482 |
| | | | | 324/426 |
| 2016/0097816 | A1* | 4/2016 | Li | H01M 4/5825 |
| | | | | 702/63 |
| 2016/0221456 | A1* | 8/2016 | Rhodes | B60L 15/2045 |
| 2017/0045587 | A1 | 2/2017 | Kim et al. | |
| 2018/0375352 | A1* | 12/2018 | Zheng | H02J 7/0063 |
| 2019/0143838 | A1* | 5/2019 | Sun | H02J 7/0048 |
| | | | | 320/124 |
| 2020/0070684 | A1 | 3/2020 | Maruno | |
| 2024/0047774 | A1* | 2/2024 | Osada | H01M 50/105 |

FOREIGN PATENT DOCUMENTS

| | | | |
|---|---|---|---|
| JP | 2004048854 A | * | 2/2004 |
| JP | 2018-98143 A | | 6/2018 |

* cited by examiner

RAILWAY CARRIAGE WITH VEHICLE MONITORING SYSTEM AND ASSOCIATED MONITORING METHOD

CROSS-REFERENCE TO RELATED APPLICATION

This application claims priority to French Patent Application No. 21 04642 filed on May 3, 2021, the disclosure of which including the specification, the drawings, and the claims is hereby incorporated by reference in its entirety.

FIELD

The present invention relates to a vehicle, in particular a railway vehicle, comprising a plurality of batteries, a charger associated with each of the batteries, at least one piece of equipment capable of being powered by the plurality of batteries, and a vehicle monitoring system.

BACKGROUND

A railway vehicle is powered by a primary energy source, for example by an overhead contact wire located above the vehicle, or by a specific power rail. It is known that the railway vehicle comprises one or a plurality of batteries, each associated with a (possibly backed-up) charger, and provided to supply auxiliary equipment of the railway vehicle, such as ventilation, lighting or means of communication with passengers in the event of passenger transport when the primary energy source ceases to supply the vehicle.

It is desirable for a driver or operator on the vehicle to be able to know the state of charge of the batteries, especially when the vehicle is not being powered by the primary energy source.

Usually, the state of charge of a railway vehicle battery is estimated using a voltmeter, or voltage-based estimator. Such an estimate is highly inaccurate, because the voltage vs. time curve during a battery discharge is almost constant over a significant portion of the discharge time, and depends on factors such as temperature and discharge current.

Another known option is a dedicated computer for each battery. In this case, if a charger is lost, i.e. if the charger stops working or is no longer connected to a battery, the other batteries continue to be charged by their own charger. Also, their computer does not indicate the state of charge of the battery whose charger is lost. The state of charge information for all batteries is therefore not complete.

SUMMARY OF THE INVENTION

The present invention is intended to overcome the disadvantages listed above.

To this end, the present invention relates to a vehicle, in particular a railway vehicle, comprising a plurality of batteries, a charger associated with each of the batteries and at least one piece of equipment capable of being powered by the plurality of batteries, and a system for monitoring the vehicle, the monitoring system comprising at least one sensor of a battery state parameter for each battery, a communication network adapted to receive information from each battery state parameter sensor and each charger, and to transmit the received information to a processor, the processor being adapted to process the received information into processed information and to transmit the processed information, the processor being adapted to process information relating to a battery whose associated charger is switched off or faulty using the information received for the other batteries.

With the invention, a driver of a vehicle, in particular a railway vehicle, or a railway operator receives reliable information on the state of charge of the batteries and the remaining operating time when all or part of the vehicle is running on the batteries. The invention takes into account operating constraints such as degraded modes and operating conditions such as vehicle running, vehicle maintenance, vehicle storage or loss of power from the primary power source which may require evacuation due to the absence of an essential function such as lighting.

A railway vehicle carriage according to the invention may comprise one or more of the following features, taken alone or in any combination that is technically possible:
  the processed information comprises the state of charge of a battery and/or the depth of discharge of a battery and/or a remaining time of use of a battery and/or the health status of a battery;
  the communication network is able to transmit the processed information to a display device connected to the communication network via the processor and/or to a fixed or mobile terminal for operators outside the vehicle;
  the processor is able to estimate the state of charge of at least one battery of the carriage when the vehicle is switched on after the vehicle has been switched off;
  the battery state parameter is selected from battery temperature, battery voltage, and current supplied to/from the battery;
  the equipment powered by the plurality of batteries is selected from a set of vehicle auxiliary equipment.

The present invention also relates to a method of monitoring a vehicle carriage, comprising providing a vehicle carriage according to the invention, the method comprising a step of processing information about a battery whose associated charger is switched off or faulty using information received for the other batteries.

A monitoring method according to the invention may comprise one or more of the following features, taken alone or in any combination that is technically possible:
  the processed information comprises the state of charge of a battery, the depth of discharge of a battery, a remaining time of use of a battery and/or the state of health of a battery, and wherein the depth of discharge is calculated from an integration of currents supplied to the battery over time;
  the processed information comprises the state of charge of a battery, the depth of discharge of a battery, a remaining time of use of a battery and/or the state of health of a battery, and wherein the remaining time of use of the battery is estimated taking into account an operating mode of the vehicle;
  the vehicle operating mode is selected from vehicle storage, vehicle maintenance, loss of primary power source, or emergency evacuation situation, or any other mode activated by driver control or automatically.

BRIEF DESCRIPTION OF THE DRAWINGS

The invention will be better understood upon reading the following description, given only as an example, and with reference to the drawings, in which.

DETAILED DESCRIPTION

Figure 1:
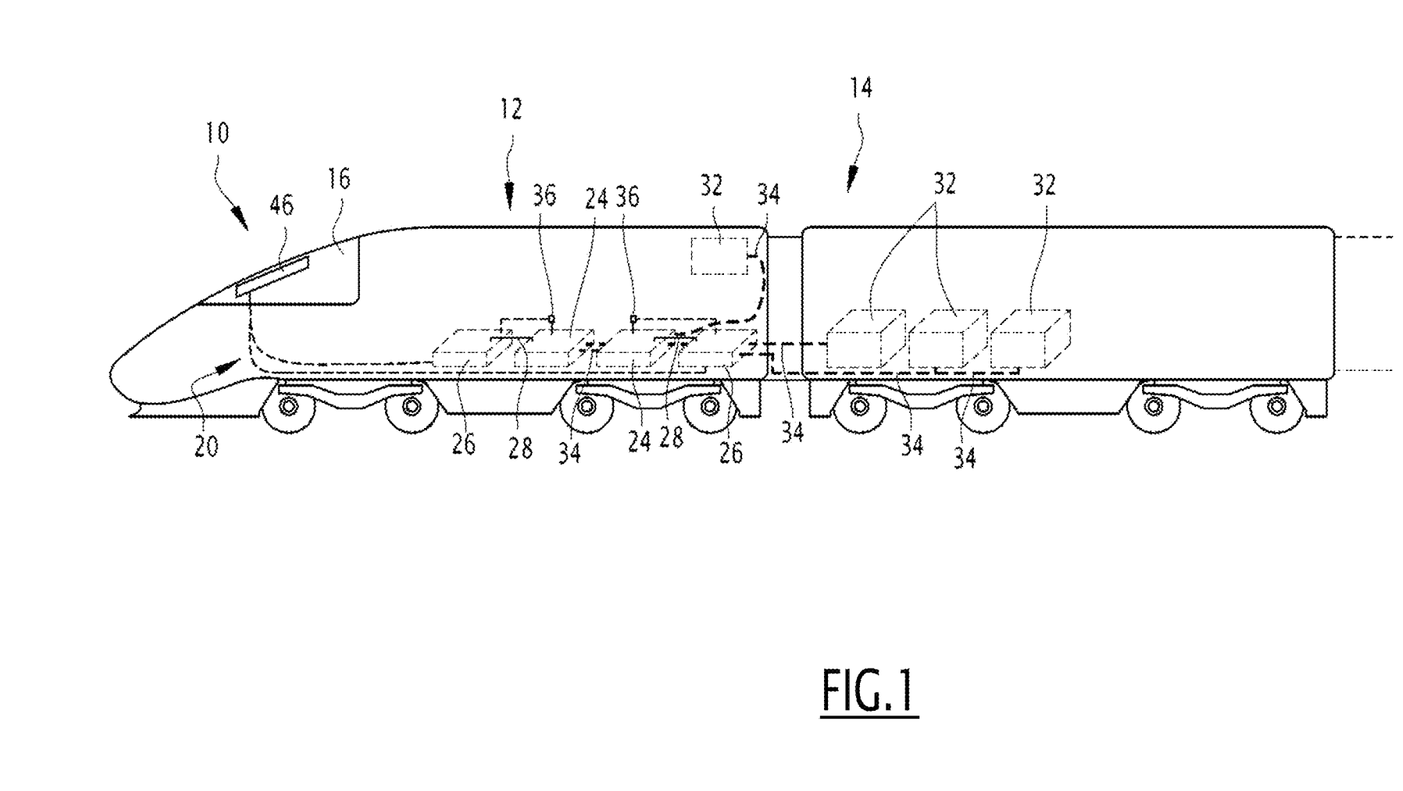
FIG. 1 shows a schematic representation of a railway vehicle according to an example embodiment of the invention.

FIG. 1 shows a railway vehicle 10 comprising an end carriage 12 and possibly an intermediate carriage 14 (only one of which is shown for simplicity, the other carriages 14 being similar to the one shown). The railway vehicle 10 may of course comprise at least one additional end carriage and a plurality of intermediate carriages forming a single unit. A set of several single units will form a convoy, also called a multiple unit, with the same or different configuration and type of carriages.

The end carriage 12 may or may not comprise a cab 16 or a fixed or remote driver's console.

The end carriage 12 comprises a railway vehicle monitoring system 20, a plurality of batteries 24, and a plurality of chargers 26 adapted to recharge each of the batteries 24.

Alternatively, one of the end carriages 14 comprises a railway vehicle monitoring system 20, a plurality of batteries 24, and a plurality of chargers 26 adapted to recharge each of the batteries 24.

A battery 24 and an associated charger 26 form a charger-battery unit 30. Each charger-battery unit 30 may or may not be located in the same carriage. All of the charger-battery units 30 may or may not be in the same carriage.

The batteries 24 are typically nickel-cadmium batteries.

Alternatively, the batteries 24 are of a different type, of any type suitable for a railway vehicle, for example lithium-ion or lead.

Each battery 24 typically has a mass of between 100 kg and 2 tonnes.

Each charger 26 associated with a battery 24 is typically connected to the battery 24 by at least one wire 28.

A charger-battery unit 30 supplies power to at least one piece of equipment 32.

Each piece of equipment 32 is connected to at least one of the charger-battery assemblies 30 by means of at least one respective wire 34 connected to the battery in parallel with the wire 28 linking the battery 24 to its associated charger 26.

Figure 2:
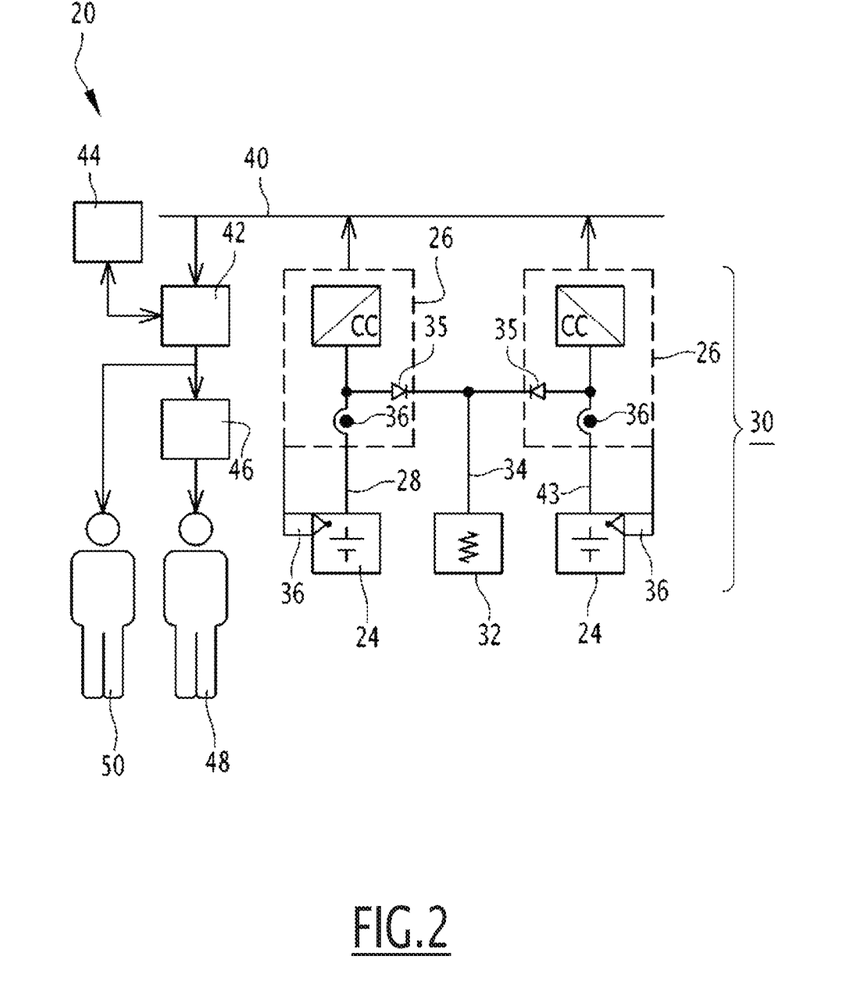
FIG. 2 shows a schematic of a monitoring system for the railway vehicle in FIG. 1.

As shown in FIG. 2, each charger 26 is, for example, coupled to an anti-reverse diode 35 connected to the wire 34 linking the charger-battery assembly 30 to the equipment 32 and directed from the charger 26 to the equipment 32. The anti-reverse diode 35 prevents a short circuit between the parallel voltage sources of each charger-battery assembly 30, potentially at different voltage values.

A given piece of equipment 32 may be powered by a plurality of charger-battery assemblies 30 connected in parallel, as shown in FIG. 2.

The equipment 32 is selected from a set of auxiliary equipment of the railway vehicle 10.

Auxiliary equipment 32 is, for example, equipment that needs to operate even when a primary source of vehicle power is lost.

The auxiliary equipment includes essential 32 and non-essential 32 equipment.

Non-essential equipment 32 includes, for example, comfort lighting, advertising screens, air-conditioning electronics, and USB sockets for passengers.

Essential equipment 32 includes, for example, emergency lighting, ventilation and passenger communication.

The monitoring system 20, shown in FIG. 2, comprises at least one sensor 36 of a state parameter of the battery 24.

The state parameter of the battery 24 is, for example, a temperature of the battery 24, the current, or the voltage.

Temperature is typically expressed in degrees Celsius (° C.).

Current is typically expressed in Amperes (A).

Voltage is typically expressed in Volts (V).

Preferably, each battery 24 is provided with a sensor 36 of a battery state parameter.

The monitoring system 20 further comprises a communication network 40 adapted to collect information from each battery state parameter sensor 36 and each charger 26, and to transmit the received information to one or more processors 42.

The communication network 40 is typically an Ethernet or Controller Area Network (CAN).

The processor 42 is configured to process the received information into processed information, and to transmit the processed information.

Processed information comprises, for example, the state of charge of a battery 24, the depth of discharge of a battery 24, a remaining time of use of a battery 24, and/or the health status of a battery 24.

Other examples of processing received information will be discussed later in the description.

The processor 42 typically comprises a processor.

The monitoring system 20 further comprises at least one memory 44 suitable for storing at least some of the information received and/or processed by the processor 42.

The memory 44 stores the information, for example continuously, or at random or predetermined times.

Pre-determined times are, for example, when the chargers 26 are switched on or off, or times defined by a timer.

In one embodiment, the monitoring system 20 comprises a plurality of memories 44 that store information simultaneously so as to compensate for the failure of one of the memories 44.

According to the invention, the processor 42 is adapted to use information from a charger 26 or a sensor 36 associated with one of the batteries 24 to obtain information relating to another battery 24, detailed below.

Preferably, the monitoring system 20 further comprises a display device 46 connected to the communication network 40 via the processor 42, the display device 46 being adapted to display at least one piece of information relating to at least one battery 24.

The display device 46 is for example a screen placed in the driver's cab 16 for the driver 48 of the vehicle or the on-board personnel, as shown in FIG. 1.

Alternatively or additionally, the display device 46 is a fixed or mobile terminal, e.g. a telephone, an electronic tablet, or a computer, for operators 50 outside the vehicle, e.g. maintenance personnel or ground personnel, e.g. railway station traffic management personnel. In this embodiment, the processor 42 is adapted to transmit the information using a wireless communication protocol.

Preferably, the communication network 40, the processor 42, the memory 44 and the display 46 are those typically present in a railway vehicle.

Thus, the monitoring system 20 according to the invention makes use of already available computing means, thereby dispensing with the need for a dedicated computer.

Figure 3:
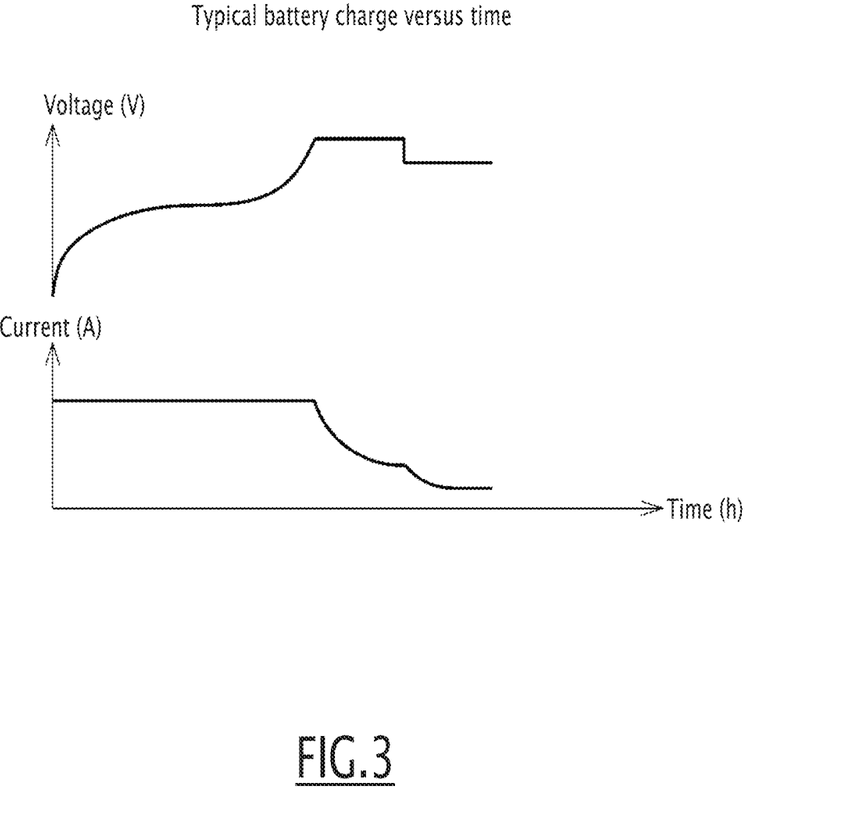
FIG. 3 shows two graphs of battery voltage versus time during charging (top) and battery current versus time during charging (bottom)

The charging of a battery typically consists of two or three main steps, as shown schematically in FIG. 3. The first step is a step in which the current is constant and the voltage increases. The second, optional step is a step in which the voltage is substantially constant and high, known as the "boost" voltage, and the current decreases sharply. The last step, third or second as the case may be, is a step during which the voltage is substantially constant over time, at a value lower than the boost voltage value, the so-called "constant floating voltage", during which the current decreases asymptotically. This last step is called "floating".

Floating is considered to be achieved when the charging current is below a predetermined value of current to the battery. Below this value, the capacity that the battery can still accumulate during charging is considered negligible.

"Battery capacity" means the amount of electrical energy that the battery is capable of delivering after a full charge, at a given discharge current rate, a given cut-off voltage and a given temperature. It is usually expressed in Ampere-hours (Ah).

Each battery has a slightly different capacity by design, within a tolerance range.

The predetermined value of current to the battery is low enough that the capacity of the battery when charged is within this tolerance range, and high enough to be detected quickly enough.

Figure 4:
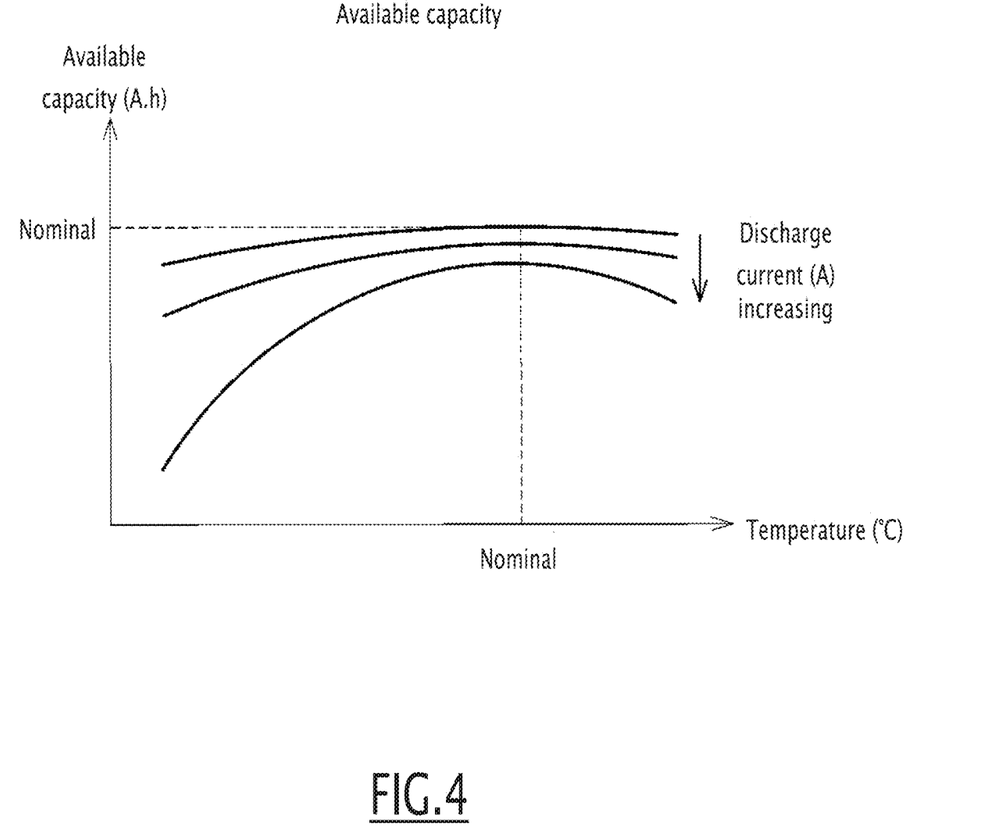
FIG. 4 shows a graph of the available capacity of a battery as a function of temperature and discharge current.

An available battery capacity is defined as a function of temperature, nominal capacity, current, charging method, etc., as shown in FIG. 4, and as a function of battery ageing.

The available capacity is typically expressed in Ampere-hours.

The rated capacity of a battery is defined as the amount of electricity, expressed in ampere-hours, specified by the manufacturer, that the battery is capable of delivering for a defined minimum number of hours after charging, resting and discharging, under the conditions specified in the associated standards.

For example, by convention for Nickel-Cadmium, the nominal capacity of a battery is defined by the amount of electricity expressed in ampere-hours stated by the manufacturer, which the battery is capable of delivering in 5 hours at a temperature of 20° C.

A depth of discharge is defined by the capacity discharged from the battery.

The depth of discharge of a battery is expressed in Ampere-hours.

The depth of discharge is at least 0, when the battery is charged or in the asymptotic end-of-charge phase, called "floating". The depth of discharge is at the maximum of the rated capacity value.

An initial depth of discharge is defined as the depth of discharge stored by the memory 44 at the previous disengaging of the railway vehicle, to which is added the depth of discharge due to the de-powering of the vehicle, which results in a depth of discharge typically equal to the residual consumption by the de-powering time.

"Disengaging of the railway vehicle", or "sleep of the railway vehicle", means switching off the vehicle. When the vehicle is disengaged, most of the equipment is no longer powered.

This allows the vehicle to be started with the most charged battery possible and avoids unnecessary consumption by the equipment.

When the railway vehicle 10 is unpacked, the memory 44 records the unpacking time and the depth of discharge of each battery 24.

The usage profile of the rail batteries is well-defined, thanks to the monitoring of the driver's actions and the controls of the monitoring system 20 of the railway vehicle 10, such as the automatic load shedding of consuming equipment 32 for example.

Automatic load shedding of consumer equipment consists of cutting off the power supply to certain equipment via an electrotechnical means, or sending them a signal, so that they reduce the current drawn from the batteries to a very low value. This load shedding can be triggered by an event such as the loss of the primary power source or one or more battery chargers, and possibly a time delay. Load shedding can also be triggered, in combination or as an alternative, by a voltage threshold measured at a supply bus.

Each operating mode of the vehicle 10 is well-defined, and therefore the current and energy consumption at the batteries 24 are already known.

Accordingly, for each operating mode of the vehicle 10, for example selected from storage of the vehicle 10, maintenance of the vehicle 10, loss of the primary power source, or an emergency evacuation situation, or any other mode activated by a driver control or automatically, an average battery current parameter is defined.

The average battery current parameter is equal to the average of the currents supplied to the battery in a defined vehicle operating mode 10.

The change in depth of discharge when the vehicle is de-energised comes from equipment 32 that consumes power continuously, for example ground/board communication systems, remote railway vehicle 10 wake-up modules, or parking lights for example.

When the railway vehicle 10 wakes up, i.e. when the vehicle 10 is switched on, the processor 42 calculates the initial depth of discharge as follows:

$$\text{initial depth of discharge} = \text{depth of discharge during the previous disengagement} + (\text{wakeup time} - \text{previous disengagement time}) * \text{average current of the battery when the vehicle is powered off}$$

The calculated initial depth of discharge is stored in memory 44. Preferably, the memory 44 stores the initial depth of discharge each time the vehicle 10 is switched off.

A charge efficiency is defined as the ratio of energy returned during discharge to the energy stored during charging. An efficiency of 80% means that 80% of the energy supplied during charging is returned by the battery during discharge.

The depth of discharge is calculated by the processor 42 as follows:

$$\text{depth of discharge} = \text{initial depth of discharge} + \text{integration of currents provided to the battery relative to time} * \text{charge efficiency (optionally)}$$

Immediate and accurate information on the state of charge is not possible, due to the flatness of the curve of battery voltage versus time during discharge, and the dependence of the voltage on current and temperature for example.

The state of charge of a battery 24 is calculated by the processor 42 as follows:

$$\text{State of charge} = \frac{\text{(available capacity - depth of discharge)}}{\text{available capacity}}$$

where the state of charge is expressed as a percentage.

Figure 5:
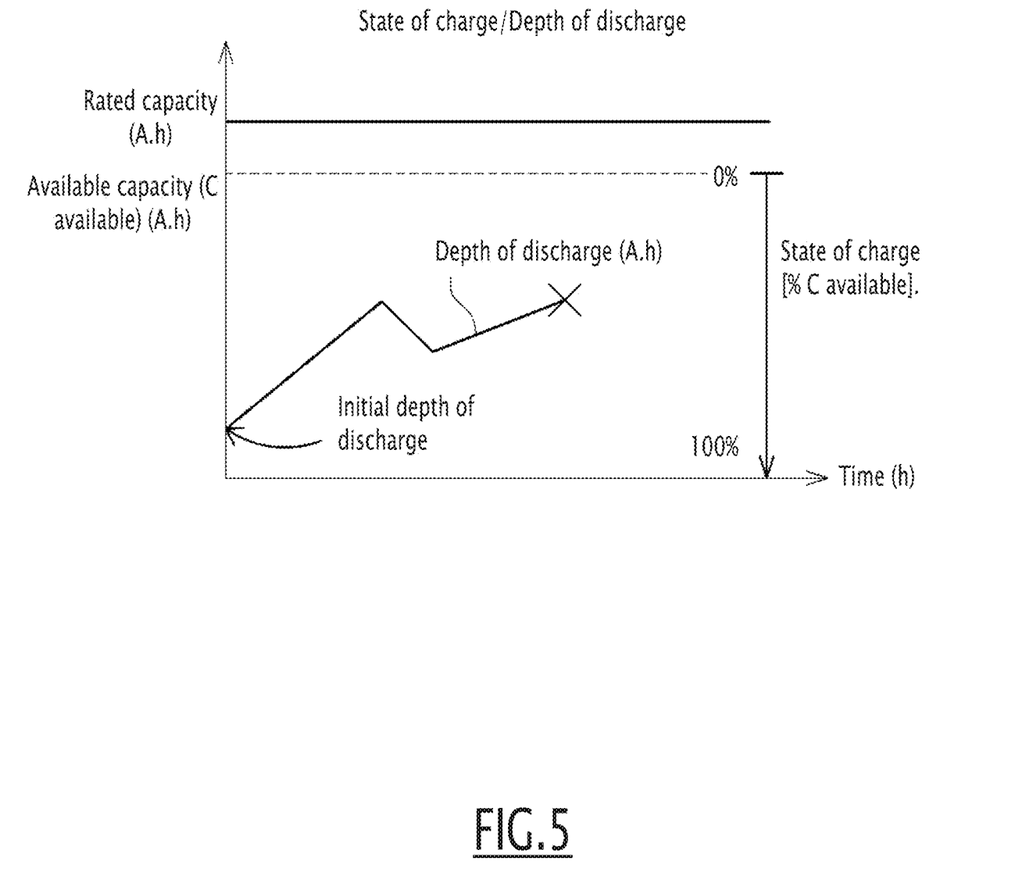
FIG. 5 shows a graph of the state of charge and depth of discharge of a battery as a function of time.

FIG. 5 shows a graph of the state of charge and depth of discharge of a battery as a function of time.

According to the invention, it is considered that the battery 24 is 100% charged when the floating state is reached.

At this point, the efficiency of the charge decreases considerably and the state of charge of the battery can be considered full.

During the charging process, the current is integrated to the nearest charge efficiency factor. Upon reaching the floating state, the estimated state of charge value may be less than 100%. However, because the floating state has been detected, the "depth of discharge" variable is set to 0.

By combination, the state of charge is then 100%.

The floating state is regularly achieved through the regular operation of the chargers 26 and their sufficiently high charging current. This removes a potential error in the integration of the depth of discharge.

For example, a battery with a nominal capacity of 110 Ah and an available capacity of 100 Ah, at a temperature of −5° C., and for a maximum current consumable by the railway vehicle of 30 A.

After several charging and discharging steps, the depth of discharge is for example 30 Ah. The state of charge is then equal to (100 Ah−30 Ah)/100 Ah=70%.

Preferably, the monitoring system 20 is configured to calculate a health status of the batteries 24.

The health status of a battery 24 is equal to the ratio of the maximum available capacity of the battery at an age t to the nominal capacity, where the maximum available capacity and the nominal capacity are assessed according to the same standardised profile, for example after charging, resting and discharging for 5 hours.

Here the health status of the batteries 24 is calculated by the processor 42.

During charging, floating is detected as described above when the charging current is below a predetermined value of current to the battery 24.

Detecting floating too early, i.e. detecting floating when the battery is only slightly charged, e.g. to 50% of its nominal capacity, shows a significant loss of capacity in the cells of a battery, leading to a higher impedance.

According to a preferred embodiment, information specifying the loaded capacity upon detection of the end of the load ("floating") is transmitted by the display device 46 to the driver, and/or by the terminal for the maintenance personnel and/or for the disembarked personnel.

This information will trigger a maintenance task as soon as necessary, such as the regenerating of damaged cells or batteries, for example, via high-voltage charging and cycling, or the replacement of damaged cells or batteries.

An estimated remaining battery usage time can then be calculated for each battery 24 by the processor 42.

For a railway vehicle 10, as explained above, the usage profile of the batteries 24 is well known under the different operating conditions of the vehicle 10, such as maintenance of the vehicle 10, storage of the vehicle 10, loss of power from the primary power source, or any other mode activated by a driver control or automatic.

Figure 6:
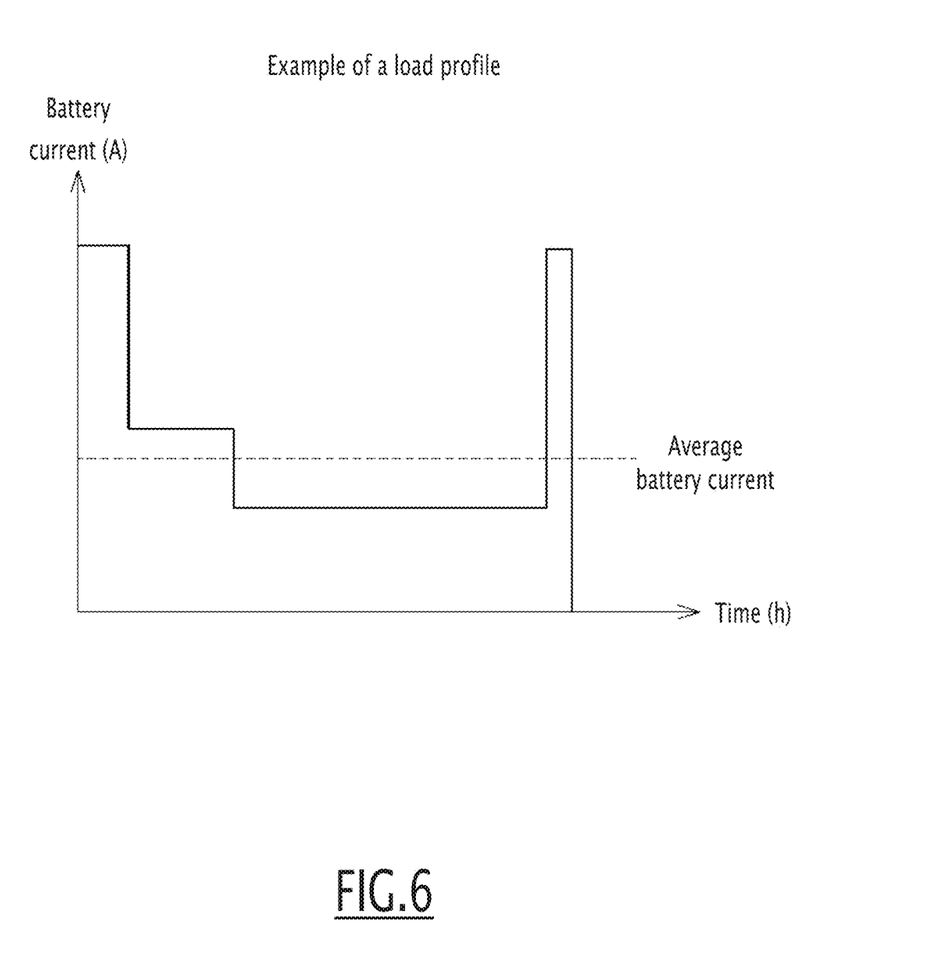
FIG. 6 shows an example of a battery discharge profile as a function of time.

An example profile is partially depicted in FIG. 6.

For example, the profile in FIG. 6 represents a discharge profile where a loss of the primary energy source of the railway vehicle 10 occurs. All consuming equipment 32 is active for a given time, in order to make a transient loss of the primary energy source transparent. A succession of load shedding operations is applied automatically by time delay, voltage measurement, or voluntary action by the driver directly or remotely. These load shedding operations are applied to remove power from non-essential equipment 32 and preserve energy in the battery 24 for essential equipment 32.

At the end of the profile, optionally, a re-engagement of the vehicle 10 or a restart of the equipment 32 is carried out, for example to evacuate the vehicle 10 or to put it back in driving condition if the primary energy source is available again.

Figure 7:
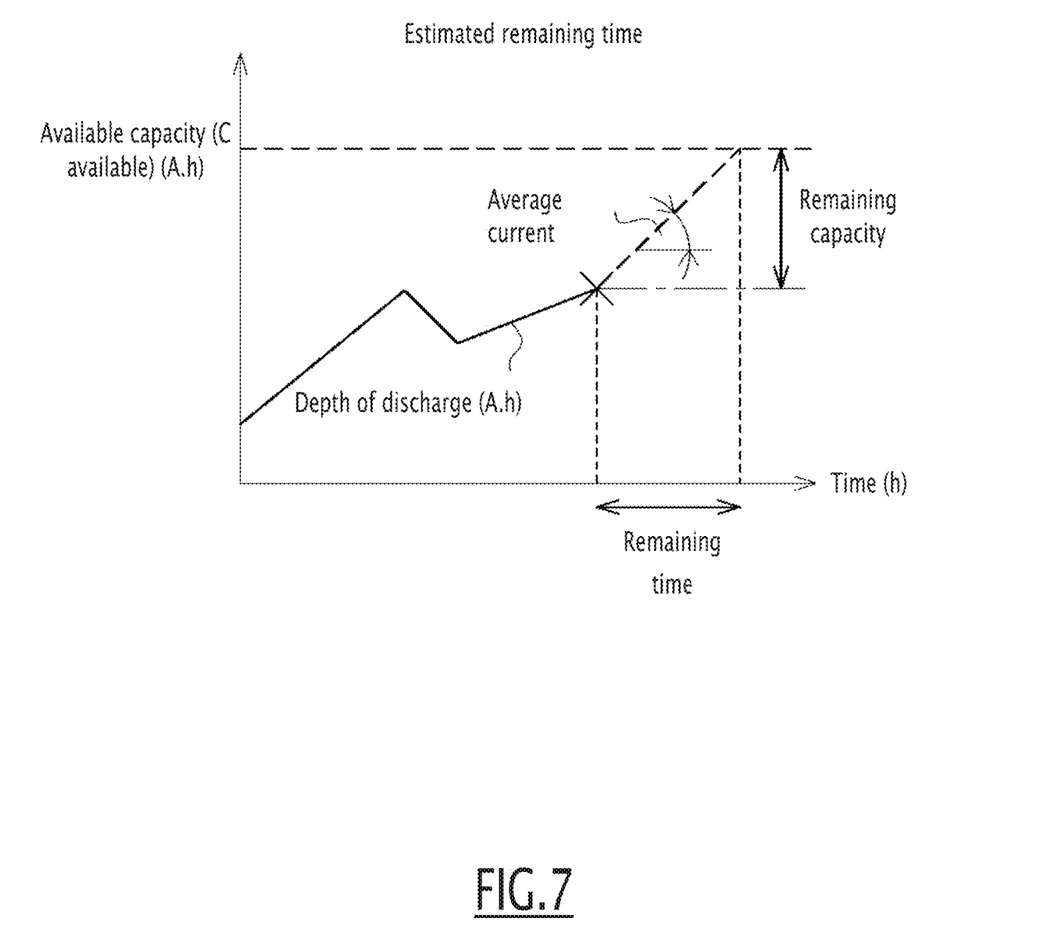
FIG. 7 shows a graph of the available capacity of a battery as a function of time and a method for estimating the remaining time.

A remaining capacity is also defined for each battery 24. The remaining capacity is equal to the available capacity minus the depth of discharge defined above.

The estimated remaining battery usage time is equal to the ratio of the remaining capacity to the average current at the battery 24 in the current operating mode of the vehicle 10, as shown in FIG. 7.

According to a preferred embodiment, information specifying the estimated remaining battery usage time is transmitted by the display device 46 to the driver, and/or by the terminal for the maintenance personnel and/or for the ground personnel.

Preferably, only the estimated remaining time of use of the minimum battery, calculated for each battery 24, is transmitted to the driver. The loss of a battery 24 can lead to a reduction or loss of essential functions such as emergency lighting, ventilation or communication with passengers.

Additionally, according to the invention, the processor 42 is adapted to use information from a charger 26 or a sensor 36 associated with one of the batteries 24 to obtain information relating to another battery 24.

For example, the discharge current and temperature measured for one of the batteries 24 are used to estimate the state of charge of the other battery 24.

This avoids failures when, for example, the charger 26 of the other battery 24 is switched off or has failed, i.e. it is no longer supplying all or part of the energy required to charge the other battery 24, or the charger 26 of the other battery 24 is disconnected from the communication network 40.

The monitoring method according to the invention thereby comprises a step of processing information about a battery 24 whose associated charger 26 is switched off or faulty using information received for the other batteries 24.

An example of obtaining the temperature and discharge current of a first battery 24 with a defective charger 26 from the temperature and discharge current of a second battery 24 is detailed below for two chargers 26, one of which has unavailable or incorrect information.

Battery 1 temperature=Battery 2 temperature

If battery 2 current>0 (discharge), then

Battery 1 current=Battery 2 current×Imbalance coefficient (optional)

Otherwise,

Battery 1 current=0 (no charge)

Where "Battery 1 temperature" refers to the temperature of the first battery whose charger has failed;

"Battery 2 temperature" refers to the temperature of the second battery;

"Battery 1 current" means the current supplied to the first battery whose charger has failed;

"Battery 2 current" means the current to the second battery; and

"Imbalance coefficient" means a coefficient of imbalance, which represents the difference in current that may occur between several batteries when discharged, due to the distribution of consuming equipment 32 on the railway vehicle 10 and the impedances of the wires. It can be estimated by calculating impedances and voltage drops in the electrical circuit 34 and/or measured during battery discharge tests on the railway vehicle 10.

From the temperature and current of discharge determined for the battery 24 whose charger has failed, the processor 42 calculates the available capacity and depth of discharge of the battery 24 whose charger 26 has failed, as detailed above.

Next, the processor 42 calculates the state of charge of the battery 24 whose charger 26 has failed, as detailed above.

Alternatively or additionally, the processor 42 calculates the estimated remaining time of use of the battery 24 whose charger 26 has failed according to the vehicle operating mode, as detailed above.

Assuming all chargers 26 are switched off or fail, a discharge current and temperature can be set, depending on the state of the railway vehicle 10, for example vehicle maintenance, vehicle storage or loss of power from the primary energy source.

What is claimed is:

1. A railway vehicle carriage, comprising:
    a plurality of batteries comprising a first battery and a second battery;
    a plurality of chargers comprising a first charger connected to the first battery and a second charger connected to the second battery;
    at least one piece of equipment powered by the plurality of batteries; and
    a vehicle monitoring system, the monitoring system comprising:
    at least one sensor of a battery state parameter for each of the plurality of batteries; and
    a communication network adapted to receive information from each sensor of the battery state parameter and of each of the plurality of chargers, and to transmit the received information to a processor,
    wherein information measured for the first battery that the first charger is switched on or not faulty is used to calculate state of charge of the second battery that the second charger is switched off or faulty,
    wherein the calculation is conducted when the railway vehicle is switched on after the railway vehicle is switched off.

2. The vehicle carriage according to claim 1, wherein the processed information comprises the state of charge of a battery and/or the depth of discharge of a battery and/or a remaining time of use of a battery and/or the health status of a battery.

3. The vehicle carriage according to claim 1, wherein the communication network is adapted to transmit the processed information to a display device connected to the communication network via the processor and/or to a fixed or mobile terminal for operators outside the vehicle.

4. The vehicle carriage according to claim 1, wherein the state parameter of the battery is selected from the temperature of the battery, the voltage of the battery, and the current supplied to/from the battery.

5. The vehicle carriage according to claim 1, wherein the equipment powered by the plurality of batteries is selected from a set of auxiliary equipment of the vehicle.

6. A method of monitoring a vehicle carriage, comprising providing a railway vehicle carriage according to claim 1, processing information about one of the batteries whose associated charger is switched off or faulty using information received for the other batteries.

7. The method of monitoring a vehicle carriage according to claim 6, wherein the information processed comprises the depth of discharge of a battery, and the state of charge of a battery and/or a remaining time of use of a battery and/or the state of health of a battery, and wherein the depth of discharge is calculated from an integration of currents supplied to the battery over time.

8. The method of monitoring a vehicle carriage according to claim 6, wherein the processed information comprises a remaining time of use of a battery, and the state of charge of a battery, and/or the depth of discharge of a battery, and/or the state of health of a battery, and wherein the remaining time of use of the battery is estimated by taking into account an operating mode of the vehicle.

9. The method of monitoring a vehicle carriage according to claim 8, wherein the mode of operation of the vehicle is selected from storage of the vehicle, maintenance of the vehicle, loss of the primary power source, or an emergency evacuation situation, or any other mode activated by a driver command or automatically.

10. The method of claim 6, wherein the information received from the sensor of the battery state parameter corresponding to the first battery is a discharge current and/or a temperature measured for the first battery.

\* \* \* \* \*